Jan. 24, 1956  F. D. NAPOLITANI  2,732,146
RETAINING MEANS FOR FILMS WOUND ON REELS
Filed Oct. 20, 1952
FIG.1
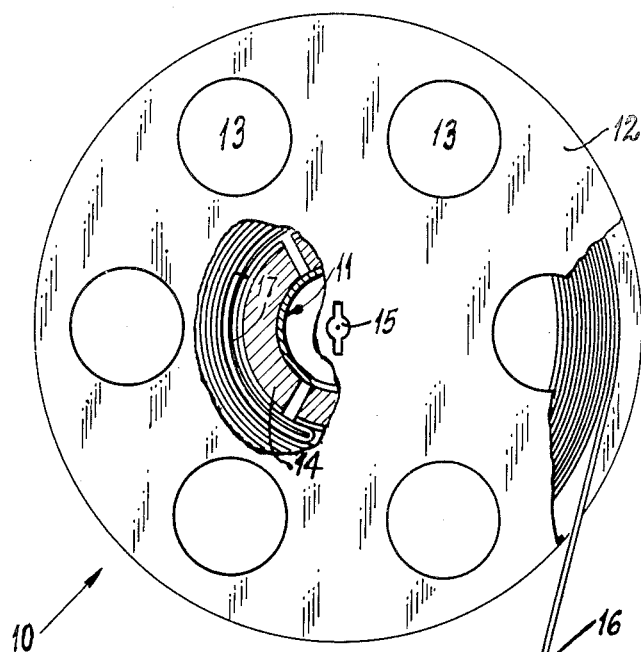
FIG.3
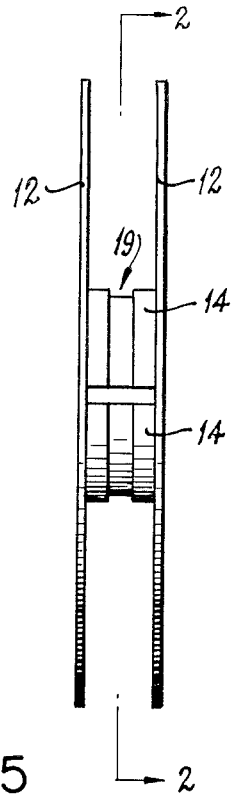
FIG.5
FIG.2
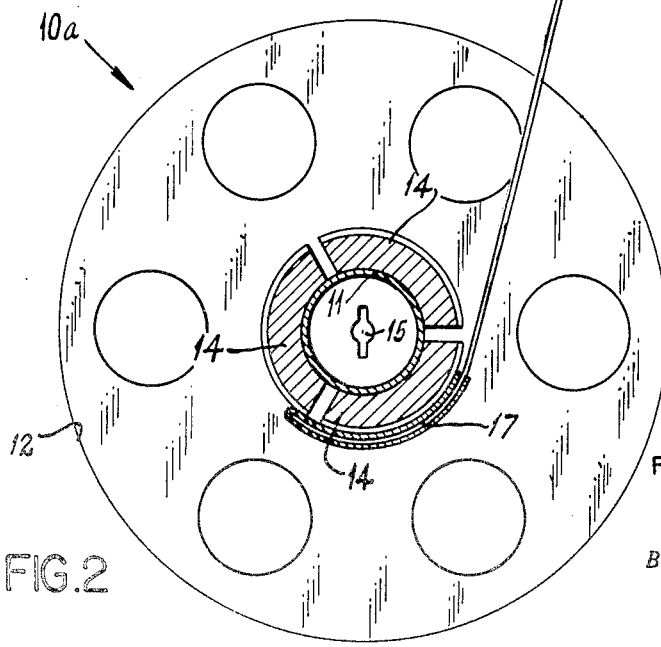
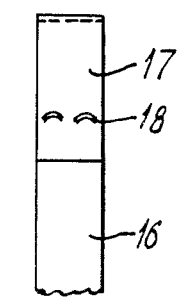
FIG.4
FRANK DONALD NAPOLITANI
INVENTOR.
BY *Joseph Blacker*
ATTORNEY

United States Patent Office 2,732,146
Patented Jan. 24, 1956

2,732,146

RETAINING MEANS FOR FILMS WOUND ON REELS

Frank Donald Napolitani, New York, N. Y.

Application October 20, 1952, Serial No. 315,646

1 Claim. (Cl. 242—74)

This invention relates to a magnetic reel for motion picture films used in picture projecting machines.

In film winding machines heretofore used in connection with picture projecting machinery, it is necessary to mechanically fix the end portion or lead-in of the film in a somewhat uncertain manner on the reel, the film being attached to the reel before the reel can be put in operation. It has not been possible until now to wind up the film directly and quickly and without fumbling, because the film has a tendency to get out of place when starting the winding operation.

The main gist of this invention is to provide improved means whereby the hub of the reel used in picture projecting machines is embraced by magnetic sections of arcuate form, the sections being spaced apart to provide north and south poles. Also to encase the lead-in of the film in a metallic clip or magnetic gripper which is of greater length than a magnetic section so as to contact an end portion of each of two magnetic sections with an intensive grip. The composite film is thereby efficiently attracted to the magnet sections and dependably gripped thereby on an extensive surface area of each of two magnetic sections. Winding of the film on the reel is made possible without danger of accidental separation.

Due to the magnetic effect, the lead-in of the film which has a metallic clip attached thereto is attracted and held fast, and in this manner the attaching prior to the winding is automatically effected even in darkness, the film holding on to the reel while it is wound.

Another object of this invention is to provide a modified magnetic attachment whereby the metal clip on the lead-in portion of the film is made of magnetized metal and the arcuate sections made of permeable metal, so that the clip will attach and hold itself to the hub portion of any reel made of permeable metal and on which the film is to be wound.

With the above and other objects in view, the invention will be hereinafter more particularly described, and the combination and arrangement of parts will be shown in the accompanying drawings and pointed out in the claim which forms part of this specification.

Reference will now be had to the drawings, wherein like numerals of reference designate corresponding parts throughout the several views, in which:

Figure 1 is a plan view of a reel embodying the invention, the reel being partly broken away to show a portion of arcuate magnetic sections in circumscribed contacting relation with the hub of the reel.

Figure 2 is a cross-sectional view taken on line 2—2 in Figure 3.

Figure 3 is a side elevation of the reel shown in Figures 1 and 2.

Figure 4 is a plan view of a fragmentary portion of the lead-in end of a film to be wound on the magnetic reel.

Figure 5 is a view of one of the metallic clips in open position.

In the illustrated embodiment of the invention, the numeral 10 indicates a magnetic reel which is shown fully wound with a film, and 10a indicates a magnetic reel the same as the reel 10 but shown with the film in unwound position.

The magnetic reel 10a comprises a bodily intact annular hub 11 at each end of which a disk 12 is suitably secured. Each disk has a plurality of openings 13 to lessen the overall weight of the reel.

A plurality of arcuate permanent magnet sections 14 is secured in circumscribing contacting relation with the hub 11. The magnet sections may be made slightly wider than the distance between the disks 12 so as to be frictionally engageable between the disks and when pressed in between the disks are held therebetween in fixed relation.

The outer periphery of the magnet sections lies in a circle concentric with the axis of the hub 11. Each magnet section has north and south poles. Each disk 12 has a key-way 15 centrally thereof whereby the reel may be secured to a driving spindle or an idler spindle.

The gist of this invention is to provide means for quickly winding a motion picture film 16 to one of the reels even in darkness. For this purpose I provide a metal clip 17 of substantially the width of the film, the clip having laterally extending grips 18 which may be of crescent form. The film 16 used herewith is preferably of the Celluloid type used in moving picture machines.

Each clip is placed over one end or lead-in of the film, and both arms of the clip are pressed together to cause penetration of the grips 18 into and through the film 16, whereby the clip becomes fixed to the film.

It is to be noted that the clips 17 are made of arcuate and magnetically permeable metal which is susceptible to magnetization by the magnets 14. Each clip 17 is curved to embrace a portion of the periphery of the magnet sections to be magnetized and held thereby in gripped relation with the reel to permit winding the film on the reel. As shown in Figures 1 and 2, it will be seen that the inner surface of the arcuate clip or magnetic gripper 17 has the same radius as the radius of the outer surface of the arcuate magnet sections 14.

In practice, the length of the clip 17 is made to provide sufficient magnetically attractive surface area, or permeable surface of contact, so that when mere contact takes place between clip and one or more magnetic sections 14 to insure sufficient magnetic grip permitting winding of the film on the reel without any tendency to disengagement.

As shown in Figure 3, each magnet section is undercut at 19 intermediate the width of the section. For best effect, the length of each magnet section is made less than the length of the metal clip to cause the clip to contact two end poles of adjacent magnet sections to obtain maximum holding power between the reel and film.

The magnet sections 14 are mounted on the hub 11 with the north and south poles of adjacent sections arranged to follow each other. After the clip 17 is secured to the lead-in portion of the film 16, the attached clip is bent to assume the arcuate form of the outer periphery of the magnet sections.

In accordance with the patent statutes I have described and illustrated the preferred embodiment of my invention, but it will be understood that various changes and modifications can be made therein without departing from the spirit of the invention as defined by the appended claim.

I claim:

In a motion picture reel having side flanges for winding a non-magnetic film strip thereon, said reel having a hub and permanently magnetized arc-shaped sections fixed to said hub in spaced-apart relation with the north and south poles of adjacent sections arranged to follow each other, the outer surface of said permanent magnets lying in a single periphery, and a film having magnetically permeable arcuate elements secured at both ends thereof and curved to embrace a portion of said outer surfaces to be magnetized on contact with said permanent magnets and thereby held in unitary relation with said reel, thereby permitting winding of said film on said reel while guided by said side flanges, each magnetic section being of a length less than the length of said magnetic gripper to cause said magnetic gripper to contact two end poles of adjacent magnet sections, said magnetic gripper and said magnets having arcuate surfaces of equal radius, causing contact of said magnet gripper along an extensive surface area of said magnets, whereby said film is secured to said magnets and to said hub with an intensive grip facilitating the winding of said film.

References Cited in the file of this patent

UNITED STATES PATENTS

| | | |
|---|---|---|
| 1,222,827 | Webster | Apr. 17, 1917 |
| 1,692,789 | Young | Nov. 20, 1928 |
| 2,119,943 | Marks | June 7, 1938 |
| 2,384,621 | Isaac | Sept. 11, 1945 |
| 2,684,815 | Holz | July 27, 1954 |